US012811271B2

(12) United States Patent
Neenan et al.

(10) Patent No.: US 12,811,271 B2
(45) **Date of Patent: *Nov. 24, 2026**

(54) ANTENNA SYSTEM

(71) Applicant: Parsec Technologies, Inc., Plano, TX (US)

(72) Inventors: Michael A. Neenan, Plano, TX (US); Richard Loy Smith, Jr., Dallas, TX (US); George Alexander Bednekoff, Plano, TX (US)

(73) Assignee: Parsec Technologies, Inc., Plano, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 19/068,652

(22) Filed: Mar. 3, 2025

(65) Prior Publication Data

US 2025/0329912 A1 Oct. 23, 2025

Related U.S. Application Data

(63) Continuation of application No. 18/412,270, filed on Jan. 12, 2024, now Pat. No. 12,266,845, which is a (Continued)

(51) Int. Cl.
*H01Q 1/08* (2006.01)
*H01Q 1/24* (2006.01)
(Continued)

(52) U.S. Cl.
CPC ............... *H01Q 1/08* (2013.01); *H01Q 1/243* (2013.01); *H01Q 1/1235* (2013.01); *H01Q 1/125* (2013.01);
(Continued)

(58) Field of Classification Search
CPC .......... H01Q 1/08; H01Q 1/243; H01Q 9/045; H01Q 5/0027
See application file for complete search history.

(56) References Cited

U.S. PATENT DOCUMENTS

| | | | |
|---|---|---|---|
| 5,966,102 | A | 10/1999 | Runyon |
| 6,067,053 | A | 5/2000 | Runyon |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Joseph J Lauture
(74) *Attorney, Agent, or Firm* — Knobbe, Martens, Olson & Bear, LLP

(57) ABSTRACT

A multi-band antenna has a feed point, a grounding location, a first portion for low band operation, a second portion for low band operation, and one or more portions for high band operation. The ground reference of the feed point for the multi-band antenna is connected to a separate object that may provide a base for the multi-band antenna. The feed point of the multi-band antenna may be spaced above the base and have a space between the feed point and a location for the ground point. The low band portion has multiple resonances that are often odd multiples of the lowest resonant response. The portions that resonant most dominantly in the high band often have multiple resonances that are even multiples of the lowest high band resonance. The multi-band antenna has resonances spaced closely enough to appear to be a wide band antenna above the fundamental high band resonance.

20 Claims, 9 Drawing Sheets

Related U.S. Application Data continuation of application No. 17/712,000, filed on Apr. 1, 2022, now Pat. No. 11,909,090, which is a continuation-in-part of application No. 17/699,578, filed on Mar. 21, 2022, now Pat. No. 11,658,382, which is a continuation of application No. 16/588,732, filed on Sep. 30, 2019, now Pat. No. 11,283,149.

(51) Int. Cl.

| | |
|---|---|
| *H01Q 1/12* | (2006.01) |
| *H01Q 5/30* | (2015.01) |
| *H01Q 9/04* | (2006.01) |
| *H01Q 9/16* | (2006.01) |
| *H01Q 11/10* | (2006.01) |

(52) U.S. Cl.

CPC ............ *H01Q 5/30* (2015.01); *H01Q 9/0421* (2013.01); *H01Q 9/045* (2013.01); *H01Q 9/16* (2013.01); *H01Q 11/10* (2013.01)

(56) References Cited

U.S. PATENT DOCUMENTS

| | | | |
|---|---|---|---|
| 6,111,550 | A | 8/2000 | Miller et al. |
| 6,618,013 | B1 | 9/2003 | Aldous |
| 9,379,453 | B2 | 6/2016 | Rentz |
| 10,224,615 | B2 | 3/2019 | Wu |
| 10,312,583 | B2 | 6/2019 | Ng |
| 10,511,086 | B1 | 12/2019 | Thill |
| 11,251,539 | B2 | 2/2022 | Hinman |
| 11,283,149 | B2 | 3/2022 | Neenan et al. |
| 11,658,382 | B2 | 5/2023 | Neenan et al. |
| 12,266,845 | B2 * | 4/2025 | Neenan .................. H01Q 5/371 |
| 12,548,922 | B2 | 2/2026 | Neenan et al. |
| 2008/0180333 | A1 | 7/2008 | Martiskainen |
| 2010/0206523 | A1 | 8/2010 | Chen |
| 2010/0253584 | A1 | 10/2010 | Yang et al. |
| 2011/0080323 | A1 | 4/2011 | Thiam |
| 2011/0102278 | A1 | 5/2011 | Rozan |
| 2012/0146872 | A1 | 6/2012 | Chainon et al. |
| 2012/0280882 | A1 | 11/2012 | Zimmerman |
| 2013/0082893 | A1 | 4/2013 | Wang |
| 2014/0139387 | A1 | 5/2014 | Jones et al. |
| 2014/0375507 | A1 | 12/2014 | Lin et al. |
| 2015/0042521 | A1 | 2/2015 | Hazen |
| 2015/0102974 | A1 | 4/2015 | Stoytchev et al. |
| 2015/0357714 | A1 | 12/2015 | Ng |
| 2016/0172750 | A1 | 6/2016 | Ng |
| 2016/0248148 | A1 | 8/2016 | Hill et al. |
| 2016/0277062 | A1 | 9/2016 | Cheon et al. |
| 2016/0285161 | A1 | 9/2016 | Apaydin et al. |
| 2017/0062952 | A1 | 3/2017 | Sundararajan |
| 2017/0237158 | A1 | 8/2017 | Gibson et al. |
| 2017/0317428 | A1 | 11/2017 | Petropoulos |
| 2017/0324171 | A1 | 11/2017 | Shehan |
| 2017/0358842 | A1 | 12/2017 | Shehan |
| 2018/0062731 | A1 | 3/2018 | Ng et al. |
| 2018/0083348 | A1 | 3/2018 | Thiam et al. |
| 2018/0109006 | A1 | 4/2018 | Ng et al. |
| 2018/0323513 | A1 | 11/2018 | Varnoosfaderani et al. |
| 2019/0148825 | A1 | 5/2019 | Huerta et al. |
| 2019/0237850 | A1 | 8/2019 | Fleischer et al. |
| 2019/0305406 | A1 | 10/2019 | Williams |
| 2019/0341674 | A1 | 11/2019 | Rosenthal et al. |
| 2019/0356051 | A1 | 11/2019 | Barrera et al. |
| 2020/0112101 | A1 | 4/2020 | Yun |
| 2020/0212948 | A1 | 7/2020 | Thill et al. |
| 2020/0243940 | A1 | 7/2020 | Greenstein et al. |
| 2020/0350664 | A1 | 11/2020 | Thill |
| 2020/0373668 | A1 | 11/2020 | Wu |
| 2020/0411972 | A1 | 12/2020 | Hicks et al. |
| 2021/0226316 | A1 | 7/2021 | Migliorino |
| 2021/0305718 | A1 | 9/2021 | Li |
| 2021/0391655 | A1 | 12/2021 | Brobston et al. |
| 2022/0384966 | A1 | 12/2022 | Chiang et al. |
| 2023/0052185 | A1 | 2/2023 | Thill |
| 2023/0145053 | A1 | 5/2023 | Kilbury et al. |
| 2023/0198553 | A1 | 6/2023 | Kim et al. |
| 2023/0223709 | A1 | 7/2023 | Guntupalli |
| 2023/0408619 | A1 | 12/2023 | El-Akkad et al. |
| 2024/0097339 | A1 | 3/2024 | Khatua |
| 2024/0304958 | A1 | 9/2024 | Matsumura |
| 2025/0329911 | A1 | 10/2025 | Neenan et al. |

FOREIGN PATENT DOCUMENTS

| | | |
|---|---|---|
| CN | 203562507 | 4/2014 |
| CN | 105281049 | 1/2016 |
| CN | 210806018 | 6/2020 |
| CN | 212303910 | 1/2021 |
| CN | 114465021 | 5/2022 |
| CN | 116151285 | 5/2023 |
| DE | 202017002307 U1 | 8/2017 |
| EP | 0 349 499 | 1/1990 |
| EP | 3 474 376 | 4/2019 |
| EP | 3 614 491 | 2/2020 |
| KR | 102260880 | 6/2021 |
| WO | WO 2005/062422 | 7/2005 |
| WO | WO 2013/090783 | 6/2013 |
| WO | WO 2018/140305 | 8/2018 |
| WO | WO 2020/010039 | 1/2020 |
| WO | WO 2023/128683 | 7/2023 |

* cited by examiner

ANTENNA SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates to the field of wireless broadband communication, and more particularly to antenna systems and antennas that cover multiple frequency bands used in the telecommunication wireless spectrum.

Description of the Related Art

Over the last few decades, Long Term Evolution (LTE) has become a standard in wireless data communications technology. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennae that are configured to electromagnetically resonate at frequencies within the dedicated bandwidth. As more wireless devices are used on a frequency bandwidth, a communication bottleneck occurs as wireless devices compete for frequency channels within a dedicated bandwidth. LTE frequency bands range from 450 MHz to 6 GHz, however, antennas configured to resonate within this spectrum only resonate within a portion of the full LTE spectrum. To capture a greater portion of the LTE spectrum, either an antenna array of various antenna configurations is used, or a single geometrically complex antenna can be used. An antenna array, in most instances, take up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired.

SUMMARY OF THE INVENTION

It is desirable to further expanded the number of frequency bands that a telecommunications system and/or radio can support for advantageous coverage. For example, there are over 30 LTE Bands that may be desirable for a radio to support if the radio is to provide advantageous coverage for a mobile device. While some of the LTE Bands overlap one another, there are numerous gaps between the bands as well. A multi-band approach to the antenna's frequency response provides a unique and novel radiating structure to support the numerous LTE bands. A multi-band antenna for the wireless telecommunication marketplace can have a feed point, a grounding location, a grounding length, a first portion for low band operation, a second portion for low band operation, and one or more portions for high band operation. The ground reference of the feed point for the multi-band antenna can be connected to a separate object that may provide a base for the multi-band antenna. The feed point of the multi-band antenna may be spaced above the base and have a space between the feed point and a location for the ground point. The ground connection can have one of more portions before reaching a ground reference some distance away from the feed point. The low band portion has multiple resonances that are often odd multiples of the lowest resonant response. The portions that resonant most dominantly in the high band most often have multiple resonances that are even multiples of the lowest high band resonance. The multi-band antenna may have enough resonances spaced closely enough to appear to be a wide band antenna above the fundamental high band resonance.

Embodiments of the present invention disclose an antenna and an antenna assembly. In some embodiments, an antenna comprises a conductive sheet having a body portion, a head portion, a first arm, and a second arm. The body portion has a front face and is configured to be positioned in an upright orientation during use as a first resonating component of a three-dimensional antenna system. The head portion is integrally connected to the body portion along an upper edge of the body portion such that the head portion extends at a first angle relative to the body portion. The head portion is configured to extend in the direction of the front face of the body portion during use of the head portion as a second resonating component of the three-dimensional antenna system. The first arm is integrally connected to the body portion along a first side edge of the body portion such that the first arm extends at a second angle relative to the body portion. The first arm is configured to extend in the direction of the front face of the body portion during use of the first arm as a third resonating component of the three-dimensional antenna system. The second arm is integrally connected to the body portion along a second side edge of the body portion such that the second arm extends at a third angle relative to the body portion. The second arm is configured to extend in the direction of the front face of the body portion during use of the second arm as a fourth resonating component of the three-dimensional antenna system. At least one of the first, second, third, and fourth resonating components of the three-dimensional antenna system is configured to resonate within a low frequency band of between 600 MHz and 700 MHz during use. At least one of the first, second, third, and fourth resonating components of the three-dimensional antenna system is configured to resonate within a high frequency band of between 2.7 GHz and 6.0 GHz during use.

In some embodiments, the antenna has a first aperture located proximate to a bottom edge of the body portion, wherein the first aperture is a soldering aperture for connecting the body portion to an antenna connection. The body portion, the head portion, and the first and second arms can have a thickness at or within 0.01 to 0.03 inches. The first angle can be at or within 89-91 degrees. The second angle can be at or within 79-81 degrees and the third angle can be at or within 79-81 degrees. At least one of the first and second resonating components of the three-dimensional antenna system can be configured to resonate within a low frequency band of between 600 MHz and 700 MHz during use. At least one of the third and fourth resonating components of the three-dimensional antenna system can be configured to resonate within a high frequency band of between 2.7 GHz and 6.0 GHz during use. The body portion can have an aperture along a symmetry line configured to be electrically coupled to a ground reference base. The head portion can have a set of apertures proximate to the upper edge of the body portion.

In some embodiments features and aspects of the invention can include a multi-band antenna, comprising a feeding portion, a grounding portion, an upright low band radiation portion, a second low band radiation portion, a third low band radiation portion of one length coupled to the second low band radiation portion, a fourth low band radiation portion of a length that can be the same as or different from the third low band radiation portion while coupled to the second low band radiation portion and not contacting to the third low band radiation portion, and a high band radiation portion. In some embodiments, the high band radiation portion comprises two arms preferably coupled to the base of the upright low band radiation portion. In some embodiments, the high band radiation portion comprises a single arm preferably coupled to the base of the upright low band radiation portion. In some embodiments, the high band radiation portion comprises a plurality of arms preferably coupled to the base of the upright low band radiation portion. In some embodiments, the high band radiation portion comprises one or more arms coupled to a low band radiation portion. In some embodiments, the high band radiation portion comprises a plurality of arms having the same length. In some embodiments, the high band radiation portion comprises a plurality of arms having different lengths. In some embodiments, the upright low band radiation portion can be coplanar with the second low band radiation portion. In some embodiments, the upright low band radiation portion is preferably not coplanar with the second low band radiation portion.

In one embodiment of the present invention, an antenna is provided comprising a body member having a front face, a first edge, a second edge, a third edge, and a fourth edge; a head member integrally connected to a first edge of the body member, wherein the head member forms a fold having a first angle towards the front face of the body member; and a first arm member and a second arm member, wherein the first arm member and the second arm member are integrally connected to the body member corresponding to the second edge and the third edge of the body member, and wherein the set of arm members each form a fold having a second angle towards the front face of the body member.

In another embodiment, an antenna assembly is provided comprising: the previously said antenna, a tuner a second body member having a front face, a first end, and a second end; a base member integrally connected to the first end of the second body member, wherein the base member forms a fold having a first angle towards the front face of the second body member; an arm member having a first end and a second end, wherein the arm member is integrally connected to the second end of the second body member along on the first end of the arm member, wherein the arm member forms a fold having a first angle towards the front face of the second body member; a face plate member is integrally connected to the second end of the arm member, wherein the face plate member forms a fold having a first angle away from the front face of the second body member; wherein the antenna and the tuner are positioned a first distance, wherein the front face of the antenna and the front face of the tuner oppositely face each other; and wherein the antenna is connected to an antenna connection of a radio and the tuner is connected to a tuner connection of the radio.

In some embodiments, an antenna comprises a body member having a front face, a first edge, a second edge, a third edge, and a fourth edge. A head member is integrally connected to a first edge of the body member, wherein the head member forms a fold having a first angle towards the front face of the body member. A first arm member and a second arm member are integrally connected to the body member corresponding to the second edge and the third edge of the body member. The set of arm members each form a fold having a second angle towards the front face of the body member.

In some embodiments, an antenna comprises a first aperture located proximate to the fourth edge of the body member. The first aperture is a soldering aperture for connecting the body member to an antenna connection of a radio. The body member, the head member, and the first and second arm members having a thickness at or within 0.01 to 0.03 inches. The first angle is at or within 89-91 degrees. The second angle is at or within 79-81 degrees. The fold having the first angle has a fold radius at or within 0.005-0.025 inches. The fold having the second angle has a fold radius at or within 0.005-0.025 inches. The antenna is formed from a cut-out of a sheet of metal. The base member has a set of apertures proximate to the fourth edge of the body member. A subset of the set of apertures is a fastener aperture for securing the body member to a stand. The head member has a set of apertures proximate to the first edge of the base member.

In some embodiments, an antenna assembly comprises a first antenna having a first body member with a front face, a first edge, a second edge, a third edge, and a fourth edge. A head member is integrally connected to a first edge of the first body member. The head member forms a fold having a first angle towards the front face of the first body member. A first arm member and a second arm member are integrally connected to the first body member at a location corresponding to the second edge and the third edge of the first body member. The set of arm members each form a fold having a second angle towards the front face of the first body member. Some embodiments include a first tuner. The first tuner can have a second body member having a front face, a first end, and a second end. A base member can be integrally connected to the first end of the second body member. The base member can form a fold having a first angle towards the front face of the second body member. Other configurations are also possible. An arm member has a first end and a second end. The arm member is integrally connected to the second end of the second body member along the first end of the arm member. The arm member forms a fold having a first angle towards the front face of the second body member. A face plate member is integrally connected to the second end of the arm member. The face plate member forms a fold having a first angle away from the front face of the second body member. In some configurations, the antenna and the tuner are positioned such that the front face of the antenna and the front face of the tuner oppositely face each other at a first distance. The antenna can be connected to an antenna connection of a radio and the tuner can be connected to a tuner connection of the radio.

In some embodiments, an antenna assembly comprises a second antenna similar in form and function as the first antenna. A second tuner similar in form and function as the first tuner can be provided. The first antenna and the first tuner forming a first antenna group, and the second antenna and the second tuner form a second antenna group. The second antenna group is a second distance away from the first antenna group. The front face of the first antenna oppositely faces a front face of the second antenna. One or more of the second body member, the base member, the arm member, and the face plate of the first tuner have a thickness at or within 0.017-0.023 inches. The first angle of the first tuner can be at or within 89-91 degrees. The fold having the first angle of the first tuner can have a fold radius at or within 0.01-0.03 inches. The first tuner can be formed from a cut-out of a sheet of metal. In some embodiments, the arm member and the base member of the first tuner comprise respective apertures, wherein the aperture of the arm member is concentrically aligned with the aperture of the base member. The face plate member of the first tuner can comprise a set of apertures. Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
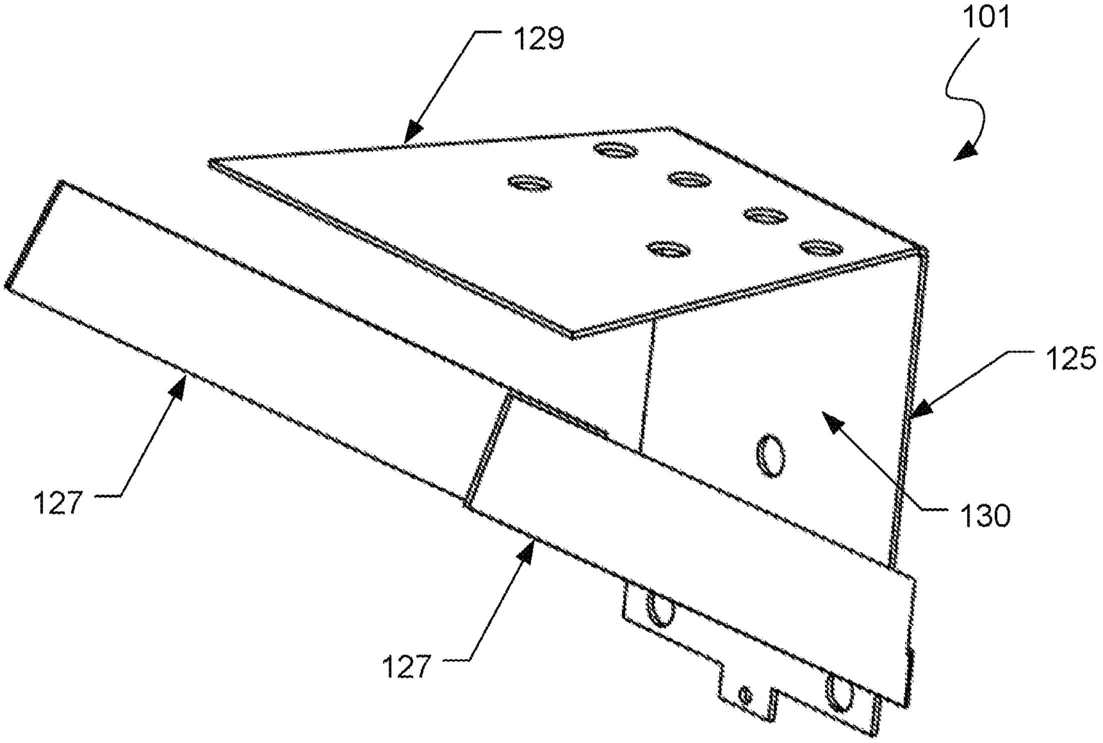
FIG. 1 is a perspective view of a formed multi-band radiating element, in accordance with an embodiment of the present invention.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present invention overcomes one or more of the above-discussed problems commonly associated with traditional antenna systems. In particular, the system of the present invention is an antenna system having a formed multi-band radiating element having three bend arm members paired with a formed ground connection element (also referred to herein as a "tuning element") that permits a frequency range of 600 MHz to 6.0 GHz, which provides a wider range of frequencies than antenna systems currently known in the art. The three bent arm members allow for the antenna to be compact, making it ideal for compact LTE transmitters. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary embodiment, however, alternate embodiments having scaled and proportional dimensions of the presented exemplary embodiment are also considered. Additional features and functions are illustrated and discussed below.

Figure 12:
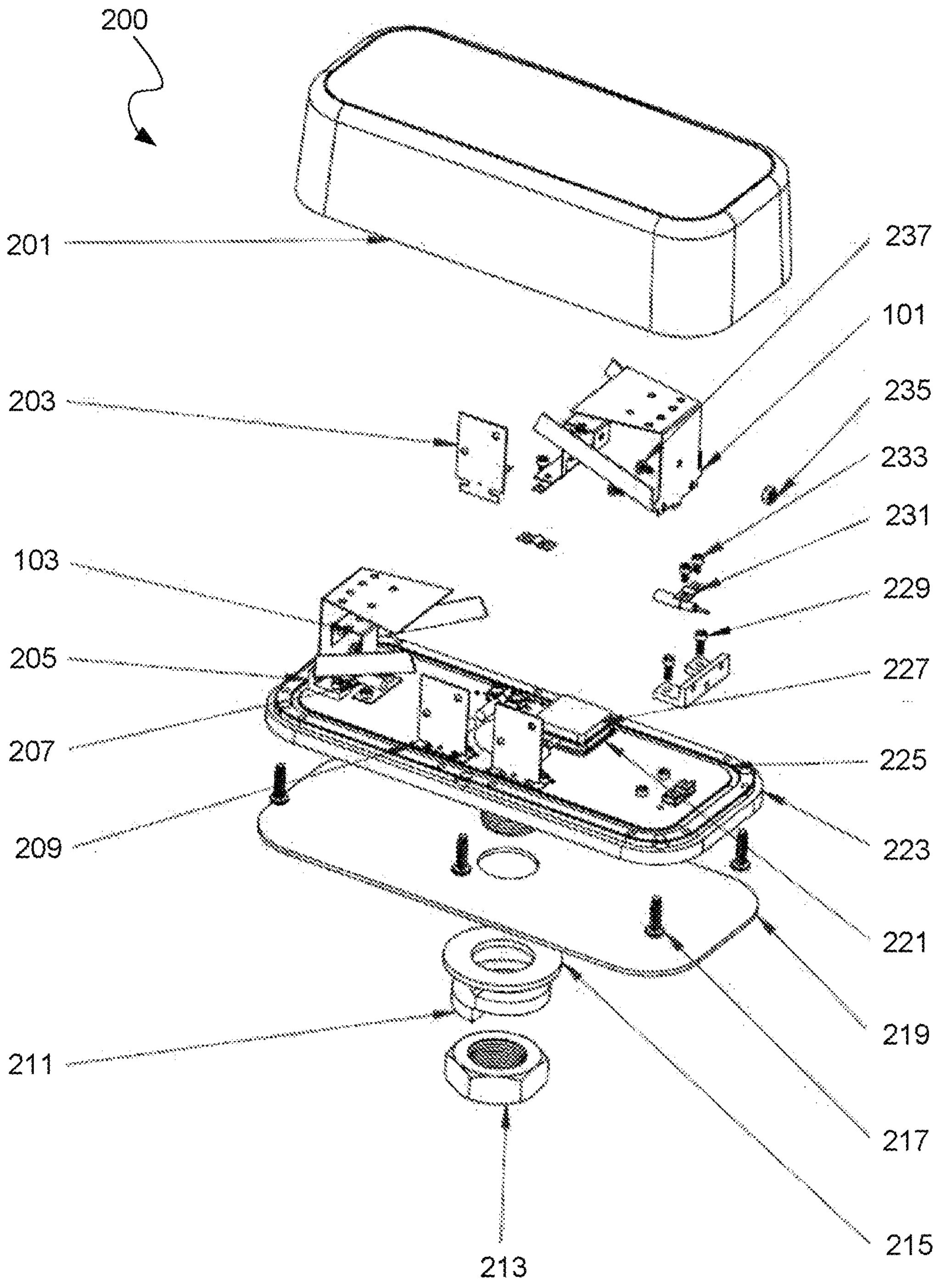
FIG. 12 is an exploded perspective view of an antenna assembly having the formed multi-band radiating element of FIG. 1 and the formed ground connection of FIG. 2 element, in accordance with an embodiment of the present invention.

Referring now to the drawings wherein like reference characters identify corresponding or similar elements in form and function throughout the several views. FIGS. 1, 3-6 illustrate assorted views of a formed multi-band radiating element component of an antenna system. FIGS. 2, 7-11 illustrate a formed ground connection element component of an antenna system that is paired with the formed multi-band radiating element component. FIG. 12 illustrates a formed multi-band radiating element and a formed multi-band radiating element employed with an antenna assembly.

In some other embodiments, features and aspects of the invention can include a multi-band antenna, comprising a feeding portion, a grounding portion, an upright low band radiation portion, a second low band radiation portion, and a high band radiation portion.

As shown in FIG. 1, a radiating element 101 can be one element or component of a multi-band antenna system. An upright low band radiation portion 125 can be a body portion of the radiating element. The upright low band radiation portion 125 can be coupled to a feeding portion at a feed point 119 to electrically excite the radiating element. As shown in FIG. 1, a second low band radiation portion 129 can be positioned at an angle relative to the body portion and extend such that the second low band radiation portion 129 is not coplanar with the upright low band radiation portion 125. In some other embodiments, the second low band radiation portion 129 can be configured without a bend such that it is coplanar with the upright low band radiation portion 125. In some embodiments, advantages of a bend can include having two distinct low band radiating portions, reducing the total height of the system to be more compact and conserve space, and configuring the system to be able to easily cover and provide protection for the system in a compact configuration with multi-band coverage. In some other embodiments the second low band radiation portion 129 can be coupled to a third low band radiation portion, a fourth low band radiation portion, and/or other radiation portions. In some embodiments material forming the second low band radiation portion can extend in a direction further away from the upright low band radiation portion 125 and comprise a slit between the material such that portion of material on each side of the slit may form a third low band radiation portion and a fourth low band radiation portion respectively, that may be coplanar with and extend beyond the second low band radiation portion. In some embodiments the third and fourth low band radiation portions can be the same length and width. In some embodiments, the length and/or width of the third low band radiation portion may be different from the length and/or width of the fourth low band radiation portion. In some embodiments, one or more of the third low band radiation portion and the fourth low band radiation portion may be angled or bent or attached such that it is not coplanar with the second low band radiation portion. Adding variations in radiation portions can provide advantageous coverage in different areas of bandwidth in some embodiments.

In some embodiments, low band portions are configured for radiation in the low band, including low band odd multiples. The high band radiation portion can comprise one or more arms 127 configured for high band radiation. In some embodiments, two arms 127 can be coupled to a lower portion of the body 125. In some other embodiments, one or more arms can be coupled to an upper portion of a low band radiation portion. In some embodiments arms can have the same length. In some embodiments arms can have different lengths. In some embodiments, one or more arms can be positioned at an angle relative to the body and/or relative to a ground plane. In some embodiments arms can be positioned at the same angle or at different angles. In some embodiments, arm portions are configured for radiation in the high band, including high even order resonances. In some embodiments, additional arm portions can be added or formed at selected locations to add coverage for additional high frequency bandwidth areas. For example, in some embodiments portions of the arms may be slit, extended, angled, bent, modified, and/or otherwise connected to provide improved coverage areas.

Figure 2:
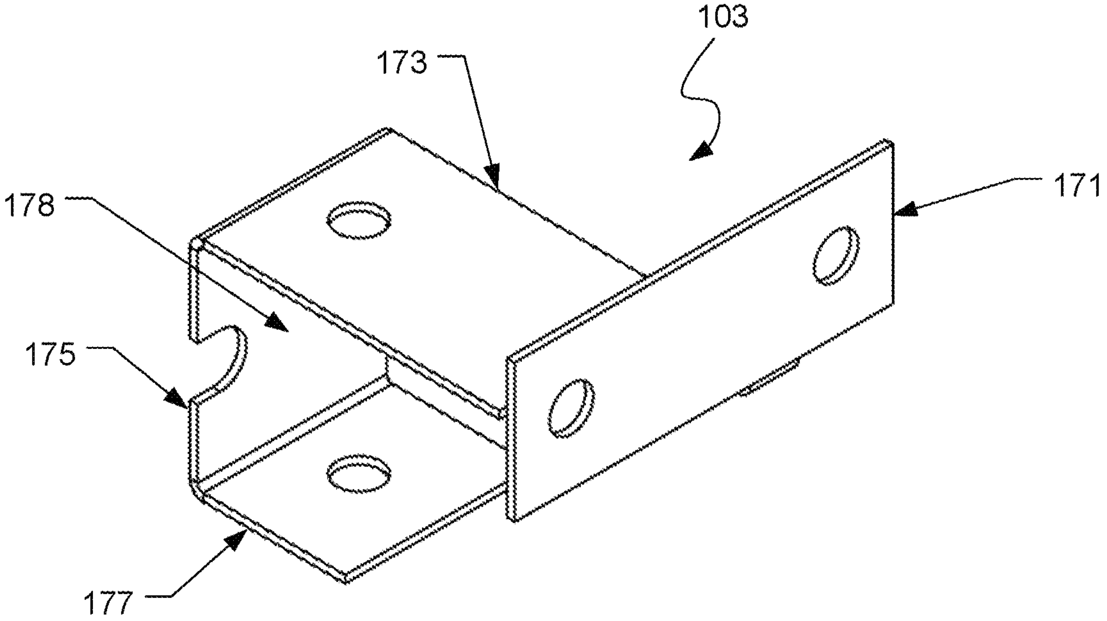
FIG. 2 is a perspective view of a formed ground connection for the radiating element of FIG. 1, in accordance with an embodiment of the present invention.
Figure 3:
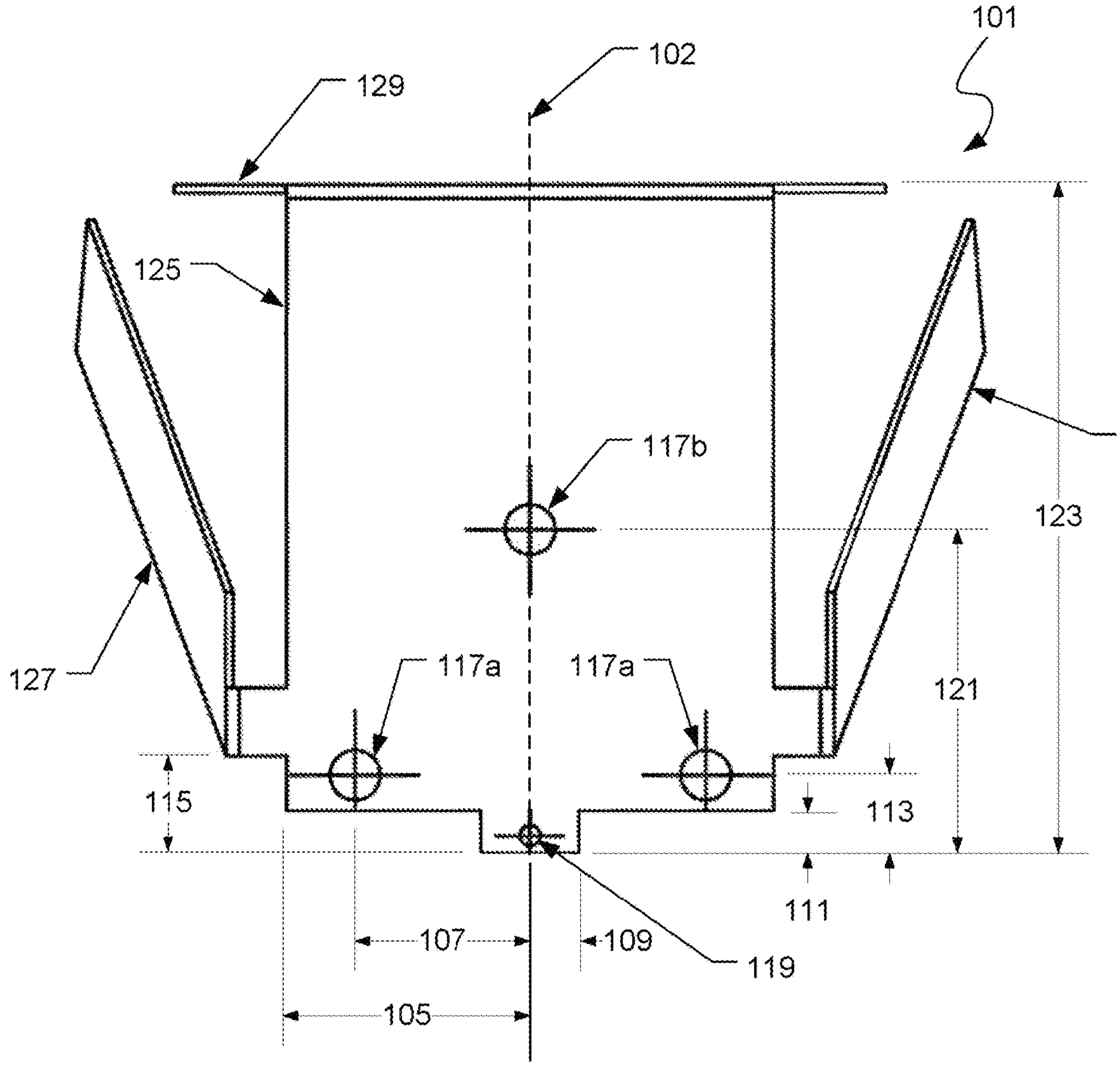
FIG. 3 is a back view of the formed multi-band radiating element of FIG. 1.

As shown in FIG. 2, according to some embodiments, a ground connection 103 is adapted and configured to couple the radiating element 101 with the grounding base. In some preferred embodiments, the portion 171 is configured to be coupled to the grounding base 223 as shown in FIG. 12. Portion 173 can be an arm portion is coupled to baseplate portion 171. The width of arm portion 173 can be adjusted to accommodate clearance for transmission line 207 in FIG. 12 which can be used to excite the radiating element 101. Low band operation is enhanced and can be adjusted by the length and width of body portion 125 and head portion 129 as well as the location, placement and configuration of opening 117*b* in body portion 125. The base portion 177 of the ground connection can be adapted and configured to be positioned against the body portion 125 of the upright low band radiation portion such that the opening in 177 and the opening 117*b* can be a point of coupling creating a ground connection. The raised ground connection being elevated relative to the feed location provides advantages to achieve the multiband coverage. Dimensions can be selected to provide harmonic resonance at higher odd orders in some embodiments. The grounding portion provides advantages for achieving multiple advantageous resonances. For example, in some embodiments, the height, width, and clearance provided for by the size of arm portion 173 can be advantageously selected. Additionally, the length and width of body portion 175 can also be advantageously selected. The location of 117*b* and the corresponding connecting location of 181*b*, shown in FIG. 10, when coupled together for the grounding connection create a symbiotic connection to provide a resonance of desired impedance to match a desired frequency and bandwidth for a low band frequency configuration in some embodiments. FIG. 3 shows twin coupling points 117*a* attached to nonconductive structural stand coupled to the base ground reference 223. More isolation can be created from the base by expanding the space 113. The feed point location 119 is configured to receive an electrical connection to excited the components.

These and other advantageous components and features will be described in more detail below with reference to the figures. Additional elements and functions as described herein may be comprised in some embodiments. This antenna configuration is adapted to be used to provide novel radiating and ground structures and can be configured in a system to function on a platform. Various platform are contemplated including for example, and without limitation, a vehicle, building, indoor enclosure, outdoor enclosure, other customer premise equipment, and or personal spaces and areas of intended use. In some applications embodiments include assemblies that employ other antenna components, including for wifi and GPS applications, which can include use of signals in licensed and/or unlicensed areas.

In some other embodiments, features and aspects of the invention can be further described as follows. FIG. 1 illustrates the dominate radiating portion 101, according to some embodiments, that can be coupled to a ground reference 223 shown in FIG. 12, and electrically excited at the feed point 119 in FIG. 3. The feed point is coupled to the upright portion 125 with what can be a narrow width tab 109 in FIG. 3. Additional isolation between 125 in FIG. 1 and 223 in FIG. 12 is obtained by adjusting 111 in FIG. 3 and consequently coupling location reference 113 in FIG. 3. For additional mechanical support, the upright portion 125, has a non-conductive coupling mechanism 205 FIG. 12 to the ground reference 223 FIG. 12. The upright portion has a coupling point 117*b* FIG. 3 for attaching the grounding portion 103 in FIG. 2 with coupling point 181*b* FIG. 10. Also coupled to the upright portion 125 are two portions 127 for assisting with the dominate radiation in the high band from the novel device. One or more portions similar to 127 may be used for assisting in the high band portion of the radiation are realizable in the implementation of this approach. Higher even order resonances may radiate from portions similar to 127 of the device to assist in the multi-band properties of the device. Furthermore, there is an additional portion 129 coupled to the upright portion 125 that may be perpendicular in nature for its orientation. Though it is not necessary for it to be bent near 90 degrees as depicted in this illustration and can be shown to be perceptibly straight in other embodiments, by bending the upright portion 129 to realize two distinct portions, the total height of the radiating device is reduced and as such the total volume of the cover 201 FIG. 12 to most likely provide environmental protection is consequently reduced. The low band operation of the device is determined by several factors. Some of the factors are the length and width of 125 and of 129, the location of 117*b* FIG. 3, and the grounding portion 103, depicted in FIG. 2.

FIG. 2 illustrates the grounding portion of the device 103. Portion 171 is coupled to 223 in FIG. 12. Portion 173 is coupled to portion 171 and the width or 173 can be adjusted to accommodate clearance for assembly purposes for a transmission line 207 in FIG. 12 that may be used for excitation of the device. Portion 175 is coupled to portion 173. Portion 177 is coupled to portion 175. Portion 177 also has a coupling point 178 that is coupled to 117*b* FIG. 3. The height of 173, the width of 173, the clearance provided for in 173, the length of 175, and the symbiotic location of 117*b* FIG. 3 and 181*b* FIG. 10 all provide for a reactance that counter balances the reactance of the low band impedance to provide a resonance of desired impedance match for the desired frequency and bandwidth for the low band radiation. The location of the coupling point and the length and width of the grounding portions are also chosen to provide higher odd order resonant harmonics at the desired locations to cover a portion of the frequency band of the multi-band performance of the device.

FIG. 3 provides a back side view, compared to the isometric view provided by FIG. 1, of the predominant low band radiation portion of the device. Twin coupling points 117*a* in 101 may be coupled to a non-conductive object, 205 FIG. 12, which is coupled to 223 FIG. 12. This coupling may provide mechanical stability of the device while not disturbing or inhibiting the ground connection provided by 103. Table 1 below may provide dimensions that might be used to construct a portion of such a device.

Figure 4:
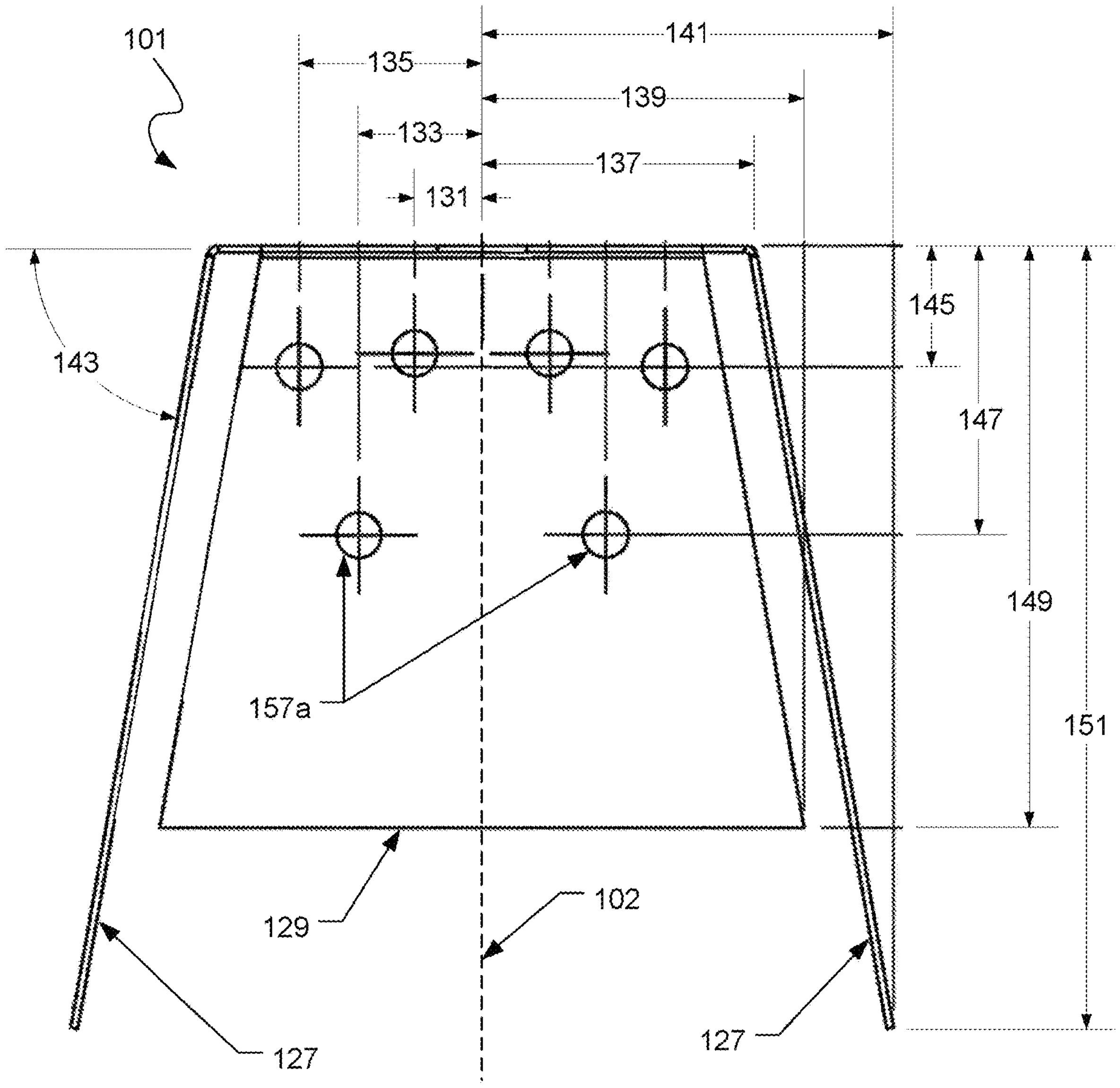
FIG. 4 is a top view of the formed multi-band radiating element of FIG. 1.
Figure 5:
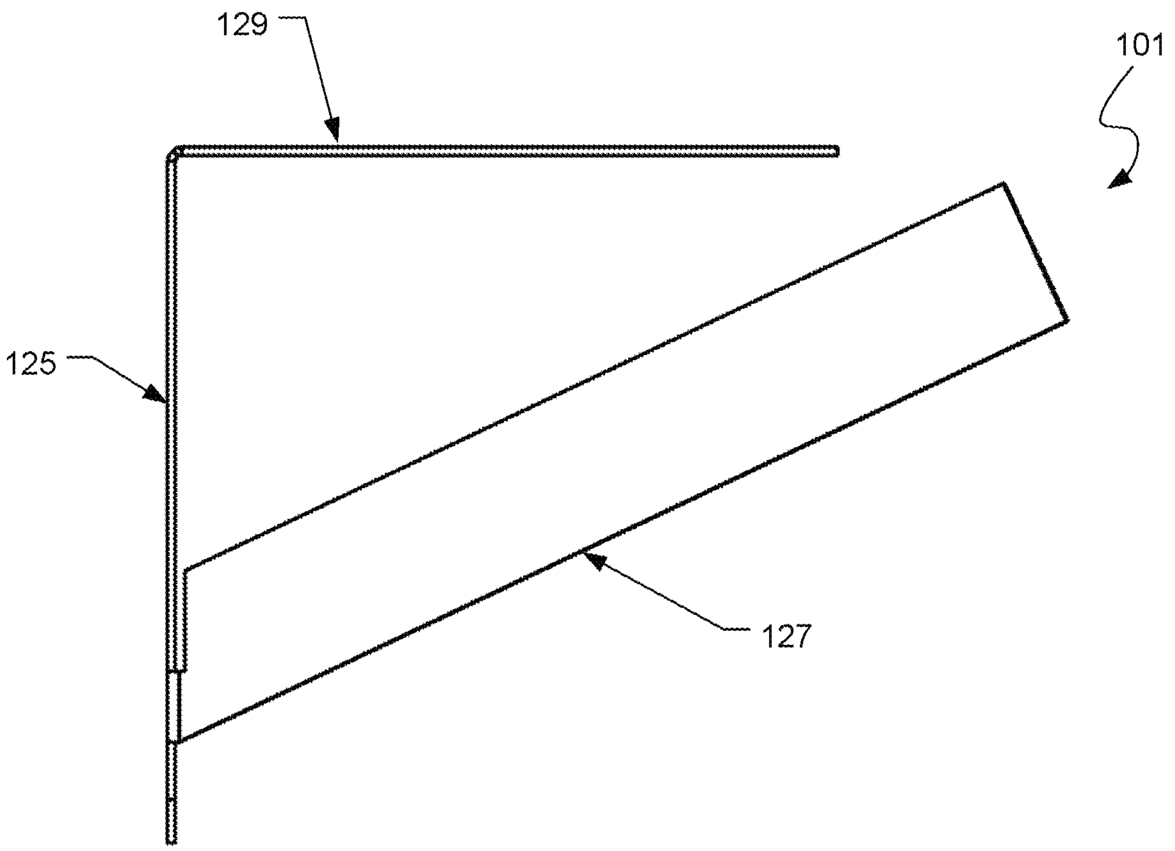
FIG. 5 is a side view of the formed multi-band radiating element of FIG. 1.
Figure 6:
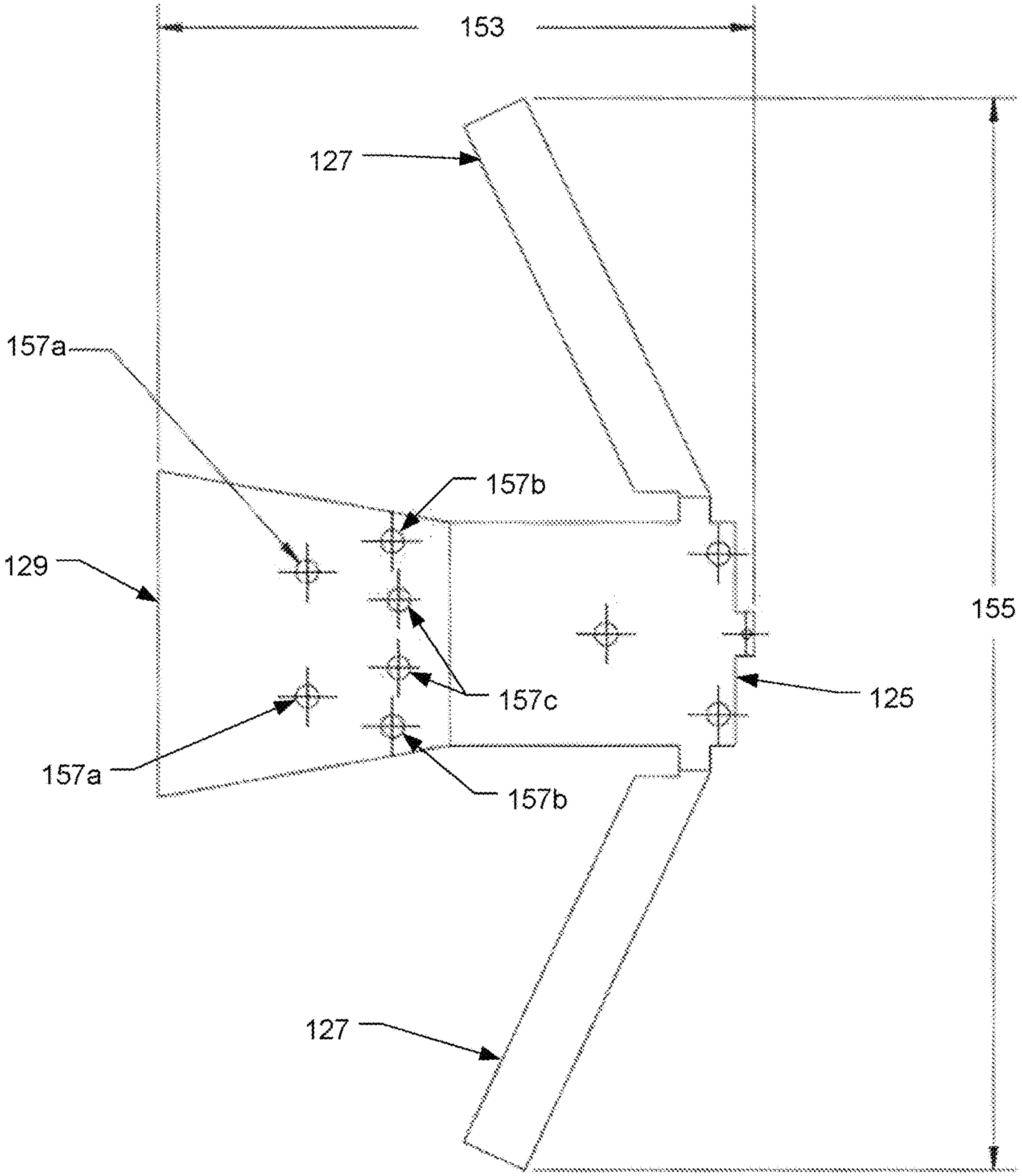
FIG. 6 is a flat layout of the formed multi-band radiating element of FIG. 1.
Figure 7:
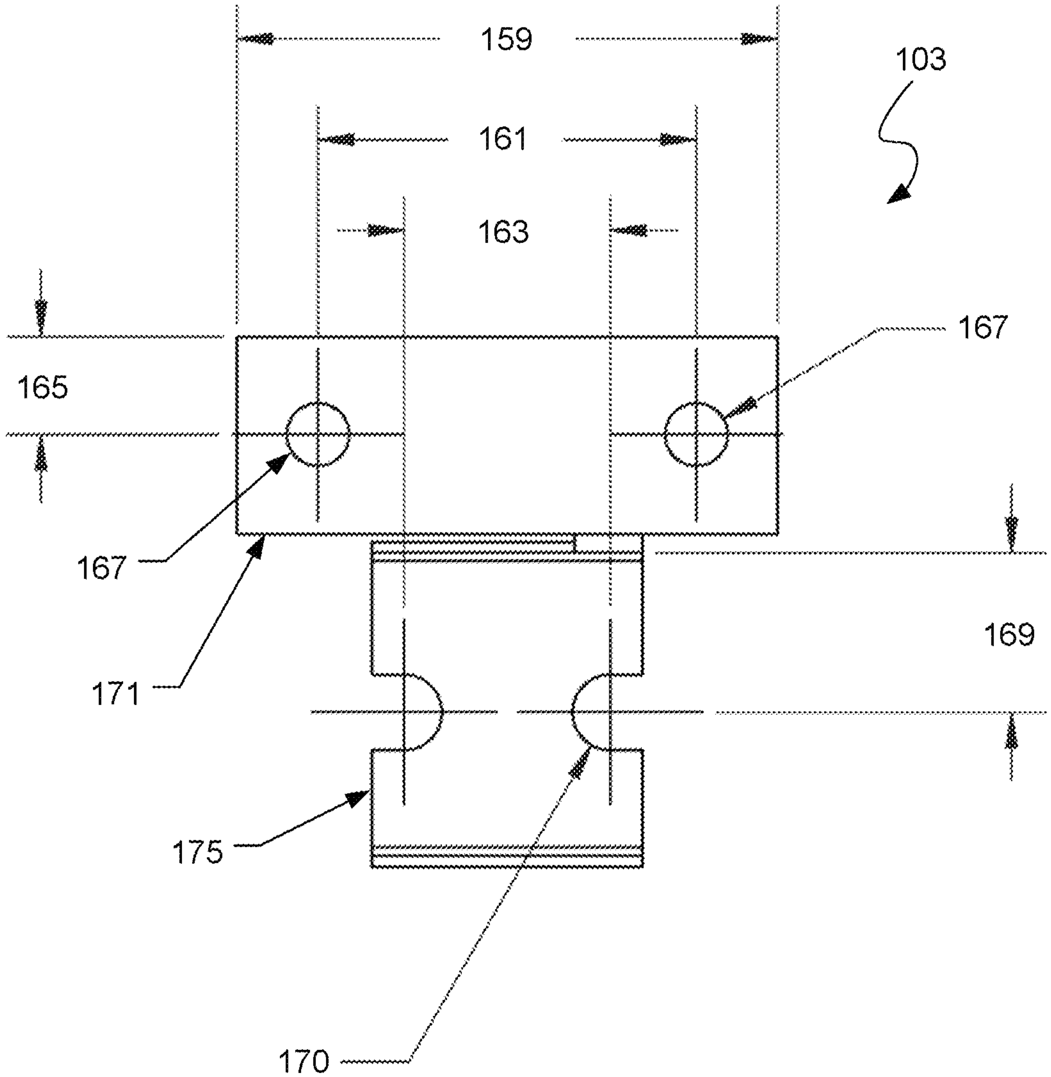
FIG. 7 is a top view of the formed ground connection element of FIG. 2.
Figure 8:
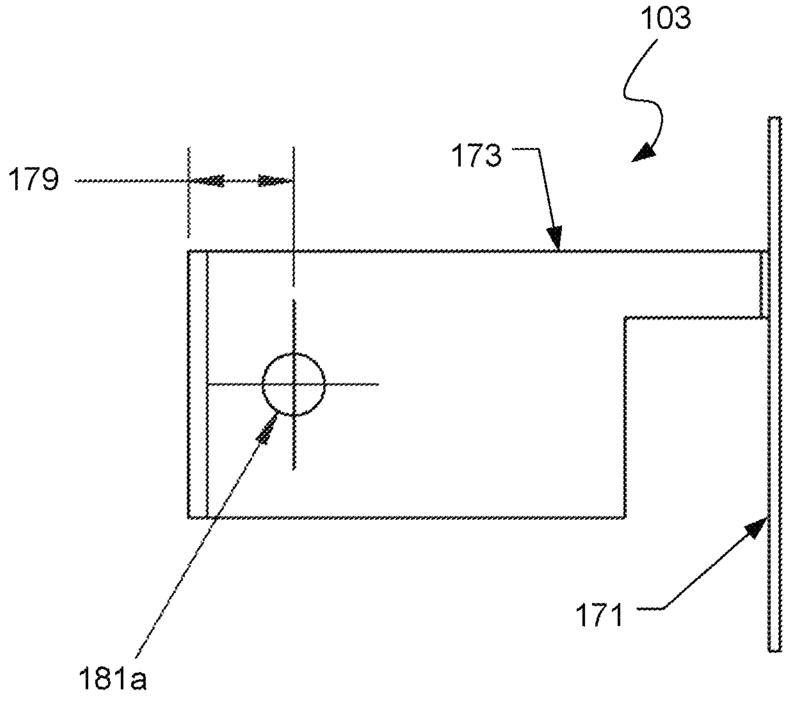
FIG. 8 is a back view of the formed ground connection element of FIG. 2.
Figure 9:
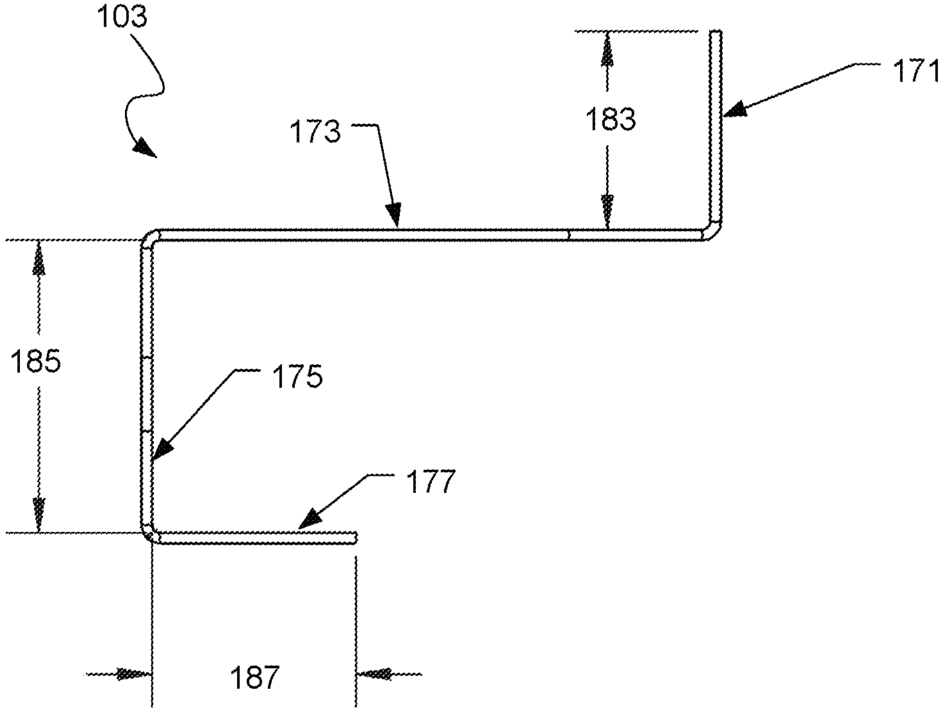
FIG. 9 is a side view of the formed ground connection element of FIG. 2.
Figure 10:
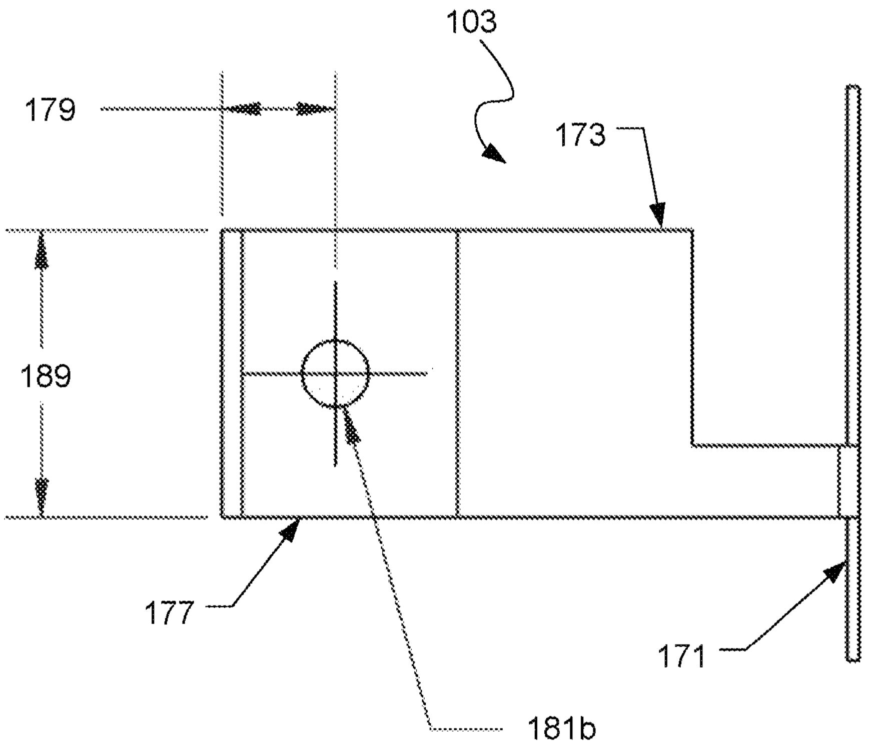
FIG. 10 is a front view of the formed ground connection element of FIG. 2.
Figure 11:
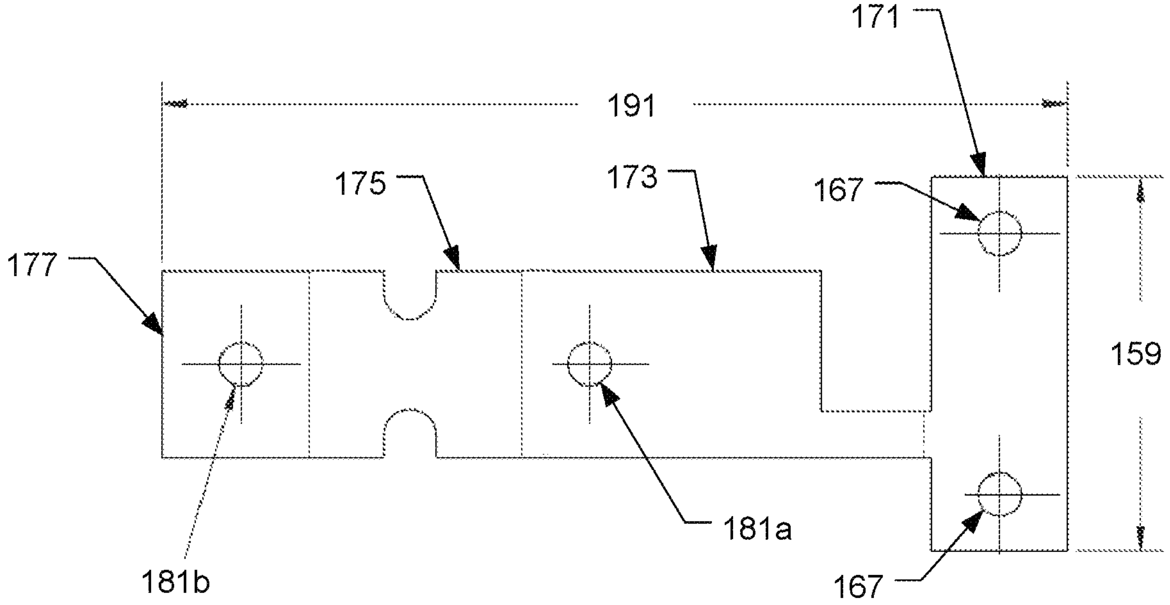
FIG. 11 is a flat layout of the formed ground connection element of FIG. 2.

FIGS. 4, 5 and 6 provide additional views of the device in FIG. 1. The clearances in the device, 157*a* 157*b*, 157*c*, may allow of ease of assembly of the completed assembly. Table 1 below may provide dimensions that might be used to construct a portion of such a device depicted in FIGS. 1, 3, 4, 5, and 6.

FIGS. 7, 8, 9, 10 and 11 provide additional views of the ground connection of the device previously shown in FIG. 2. Table 2 below may provide dimensions that might be used to construct a portion of such a device. s FIG. 12 demonstrates one possible assembly of many antennas in one configuration that includes the novel device described this application. Other configuration assemblies are contemplated and can be adapted as described and suggested herein. Between the coupling washer 215 and the environmental seal 219 is preferably a platform for the mounting of the assembly. The platform may be vehicles, buildings, indoor or outdoor equipment enclosures, and other such customer premise equipment. Those skilled in the art understand that nature of the deployment of such an assembly will change slightly in the deployed performance based on type of structure the assembly is attached to as well as the surroundings in which it is deployed.

In some embodiments, features and aspects of the invention can include an antenna system comprising a conductive sheet having a body portion, a head portion, a first arm, and a second arm. The body portion has a front face and preferably configured to be positioned in an upright orientation during use as a first resonating component of a three-dimensional antenna system. The head portion preferably is integrally connected to the body portion along an upper edge of the body portion such that the head portion extends at a first angle relative to the body portion. The head portion preferably is configured to extend in the direction of the front face of the body portion during use of the head portion as a second resonating component of the three-dimensional antenna system. The first arm preferably is integrally connected to the body portion along a first side edge of the body portion such that the first arm extends at a second angle relative to the body portion. The first arm is preferably configured to extend in the direction of the front face of the body portion during use of the first arm as a third resonating component of the three-dimensional antenna system. The second arm is preferably integrally connected to the body portion along a second side edge of the body portion such that the second arm extends at third angle relative to the body portion. The second arm is preferably configured to extend in the direction of the front face of the body portion during use of the second arm as a fourth resonating component of the three-dimensional antenna system. At least one of the first, second, third, and fourth resonating components of the three-dimensional antenna system is preferably configured to resonate within a low frequency band of between 600 MHz and 700 MHz during use. At least one of the first, second, third, and fourth resonating components of the three-dimensional antenna system is preferably configured to resonate within a high frequency band of between 2.7 GHz and 6.0 GHz during use.

According to some embodiments, a first aperture is preferably located proximate to a bottom edge of the body portion. The first aperture can be a soldering aperture for connecting the body portion to an antenna connection. The body portion, the head portion, and the first and second arms can have a thickness at or within 0.01 to 0.03 inches. The first angle can be at or within 89-91 degrees. The second angle can be at or within 79-81 degrees and the third angle can be at or within 79-81 degrees. At least one of the first and second resonating components of the three-dimensional antenna system is preferably configured to resonate within a low frequency band of between 600 MHz and 700 MHz during use. At least one of the third and fourth resonating components of the three-dimensional antenna system is preferably configured to resonate within a high frequency band of between 2.7 GHz and 6.0 GHz during use. The body portion preferably has an aperture along a symmetry line configured to be electrically coupled to a ground reference base. The head portion preferably has a set of apertures proximate to the upper edge of the body portion.

In some other embodiments, features and aspects of the invention can include a multi-band antenna, comprising a feeding portion, a grounding portion, an upright low band radiation portion, a second low band radiation portion, and a high band radiation portion.

In some embodiments, the high band radiation portion comprises two arms preferably coupled to the base of the upright low band radiation portion. In some embodiments, the high band radiation portion comprises a single arm preferably coupled to the base of the upright low band radiation portion. In some embodiments, the high band radiation portion comprises a plurality of arms preferably coupled to the base of the upright low band radiation portion. In some embodiments, the high band radiation portion comprises one or more arms coupled to a low band radiation portion. In some embodiments, the high band radiation portion comprises a plurality of arms having the same length. In some embodiments, the high band radiation portion comprises a plurality of arms having different lengths.

In some embodiments, the upright low band radiation portion can be coplanar with the second low band radiation portion. In some embodiments, the upright low band radiation portion is preferably not coplanar with the second low band radiation portion.

In some other embodiments, features and aspects of the invention can include a multi-band antenna, comprising a feeding portion, a grounding portion, an upright low band radiation portion, a second low band radiation portion, a third low band radiation portion of one length coupled to the second low band radiation portion, a fourth low band radiation portion of a length similar to the third low band radiation portion while coupled to the second low band radiation portion and not contacting to the third low band radiation portion, and a high band radiation portion. The high band radiation portion can be as described and/or shown herein in various combinations. Relative configurations of the upright low band radiation portion and second low band radiating portion can be as described and/or shown herein in various combinations.

In some other embodiments, features and aspects of the invention can include a multi-band antenna, comprising a feeding portion, a grounding portion, an upright low band radiation portion, a second low band radiation portion, a third low band radiation portion of one length coupled to the second low band radiation portion, a fourth low band radiation portion of a length different from the third low band radiation portion while coupled to the second low band radiation portion and not contacting to the third low band radiation portion, and a high band radiation portion. The high band radiation portion can be as described and/or shown herein in various combinations. Relative configurations of the upright low band radiation portion and second low band radiating portion can be as described and/or shown herein in various combinations.

In some embodiments, features and aspects of the invention can be described as follows:

Referring now to FIG. 1, a perspective view of antenna 101 is illustrated in accordance with an embodiment of the present invention.

In general, antenna 101 is a modified printed inverted-F antenna (PIFA) modified to have three bent arm members that make the antenna a three-dimensional antenna as opposed to a two-dimensional antenna generally practiced in the art for printed inverted F antennae. Furthermore, antenna 101 is a dual band monopole antenna that has a configuration that, when used in conjunction with high order electromagnetic modes generated or received by a transceiver and/or receiver (as is typically performed for PIFA antennae), permit the antenna to have an operating frequency range of 600 MHz to 6.0 GHz.

In FIG. 1, antenna 101 comprise of a body, a set of arms, and a head. The body of antenna 101 is shown as body 125. The set of arms of antenna 101 is shown as arms 127. The head of antenna 101 is shown as head 129. In one embodiment, the head and the set of arms of antenna 101 are integrally connected to the body. In other words, the head, the set of arms, and the body are a single piece wherein the head, the set of arms, and the body are differentiable based on a corresponding set of folds of antenna 101.

The components of antenna 101 are further depicted and illustrated with reference to FIGS. 3-6.

Referring now to FIG. 2, a perspective view of tuner 103 is illustrated in accordance with an embodiment of the present invention.

In general, tuner 103 is a tuning element for antenna 101. Tuner 103 comprise of face plate 171, arm 173, body 175, and base 177. The components of tuner 103 are further predicted and illustrated with reference to FIGS. 7-11.

Referring now to FIGS. 3-6, a variety of views of antenna 101 as well as a cutout of antenna 101 is illustrated according to an embodiment of the present invention. Dimensions for an exemplary embodiment of antenna 101 are included in Table 1.

Components of antenna 101 are symmetrical with respect to symmetry line 102.

TABLE 1

| Label Number | Distance (Inches) |
|---|---|
| 105 | 0.615-0.635 |
| 107 | 0.440-0.460 |
| 109 | 0.115-0.135 |
| 111 | 0.097-0.117 |

TABLE 1-continued

| Label Number | Distance (Inches) |
|---|---|
| 113 | 0.190-0.210 |
| 115 | 0.238-0.258 |
| 117a | 0.119-0.139 (Diameter) |
| 117b | 0.119-0.139 (Diameter) |
| 119 | 0.042-0.062 (Diameter) |
| 121 | 0.821-0.841 |
| 123 | 1.705-1.725 |
| 131 | 0.181-0.201 |
| 133 | 0.340-0.360 |
| 135 | 0.508-0.528 |
| 137 | 0.750-0.770 |
| 139 | 0.902-0.922 |
| 141 | 1.156-1.176 |
| 145 | 0.333-0353 |
| 147 | 0.809-0.829 |
| 149 | 1.640-1.660 |
| 151 | 2.205-2.225 |
| 153 | 3.324-3.344 |
| 155 | 5.990-6.010 |
| 157a | 0.119-0.139 (Diameter) |
| 157b | 0.119-0.139 (Diameter) |
| 157c | 0.119-0.139 (Diameter) |

Furthermore, antenna 101 has a plurality of apertures, namely apertures 117*ab*, aperture 119, and apertures 157*a-c*. In one embodiment, aperture 119 is a connection aperture for connecting antenna 101 to a radio transceiver and/or receiver. In some embodiments, antenna 101 is soldered to an antenna connection of a radio transceiver and/or receiver via aperture 119. Exemplary locations and diameter distances of apertures 117*a-b*, aperture 119, and apertures 157*a-c* are provided in Table 1.

In one embodiment, antenna 101 is manufactured as cut-out from a sheet of metal (illustrated in FIG. 6) having a thickness of 0.02 inches and has associated members bent to a corresponding angle. In alternate embodiments, the thickness of antenna 101 can range from 0.01 to 0.03 inches. In one embodiment, antenna 101 is formed such that each arm of arms 127 are folded towards a front face (i.e., face 130) of body 125 by angle 143. In an exemplary embodiment, angle 143 is at or within 79-81 degrees. In one embodiment, head 129 is folded towards the front face of body 125 at an angle at or within 89-91 degrees. In an exemplary embodiment, arms 127 and head 129 have a fold radius at or within 0.005-0.025 inches respective to body 125.

Referring now to FIGS. 7-11, a variety of views of tuner 103 as well as a cut-out of tuner 103 is illustrated according to an embodiment of the present invention.

Dimensions for an exemplary embodiment of tuner 103 are included in Table 2.

TABLE 2

| Label Number | Distance (Inches) |
|---|---|
| 159 | 0.995-1.005 |
| 161 | 0.695-0.705 |
| 163 | 0.377-0.387 |
| 165 | 0.176-0.186 |
| 167 | 0.111-0.121 (Diameter) |
| 169 | 0.290-0.300 |
| 170 | 0.136-0.146 |
| 179 | 0.192-0.202 |
| 181a | 0.111-0.121 (Diameter) |
| 181b | 0.111-0.121 (Diameter) |
| 183 | 0.375-0.385 |
| 185 | 0.555-0.565 |
| 187 | 0.385-0.395 |

TABLE 2-continued

| Label Number | Distance (Inches) |
|---|---|
| 189 | 0.495-0.505 |
| 191 | 2.421-2.431 |

Furthermore, tuner 103 has a plurality of apertures, namely apertures 167 and apertures 181*a-b*. In some embodiments, aperture 181*a* and 181*b* are concentrically aligned. Exemplary locations and diameter distances of apertures 167 and apertures 181*a-b* are provided in Table 2.

In one embodiment, tuner 103 is manufactured as a cut-out from a sheet of metal (illustrated in FIG. 11) having a thickness of or within 0.017-0.023 inches. In one embodiment, tuner 103 is formed such that arm 173 and base 177 are folded towards a front face (i.e., face 178) of body 175 at an angle at or within 89-91 degrees. Furthermore, face plate 171 is folded away from the front face of body 175 at an angle at or within 8991 degrees such that face plate 171 is planarly parallel to body 175. In an exemplary embodiment, arm 173 and base 177 have a fold radius at or within 0.01-0.03 inches respective to body 175. Furthermore, face plate 171 has a fold radius at or within 0.010.03 inches respective to arm 173.

Referring now to FIG. 12, an exploded perspective view of antenna assembly 200 employing antenna 101 and tuner 103 is illustrated in accordance with an embodiment of the present invention.

In this Figure, antenna 101 is paired with tuner 103 to form an antenna group. The antenna group is configured such that tuner 103 is a predetermined distance from the front of antenna 101 (i.e., tuner 103 is positioned between arms 127) and wherein face plate 171 is oriented to face towards the front face of body 125 of antenna 101. In some embodiments, face plate 171 is planarly parallel to body 125. In this figure, two antenna groups are oppositely positioned from each other. In other words, a first antenna group having a first antenna and a first tuner face a second antenna group having a second antenna and a second tuner such that the front of the first antenna faces the front of the second antenna. Furthermore, tuner 103 is connected to a tuner connection of a radio transceiver and/or receiver, and antenna 101 is connected to an antenna connection of a radio transceiver and/or receiver.

In this figure, antenna assembly 200 comprise of a variety of components: radome 201 is a top mounted cover for antenna assembly 200; PCB 203 is a printed circuit board; stand 205 is a structural stand for securing antenna 103 to base 223 via apertures 117*a* using screw fasteners and corresponding nuts (i.e., screws 237 and nuts 235); coax 207 is a flexible low loss coax cable; holder 209 is a structural stand for PCB 203; washer 211 is a spring washer; nut 213 is a threaded nut; washer 215 is a flat washer; screws 217 are screws for securing radome 201 to base 223; gasket 219 is a gasket that is mounted between assembly 200 and a mounting surface (not shown); tape 221 is a high bonding tape for securing GPS antenna 227 to base 223; base 223 is a die cast base member; gasket 225 is a gasket for forming a weather resistant seal between radome 201 and base 223; GPS antenna 227 is a global positioning system antenna; screws 229 are screw fasteners for securing stand 205 to base 223; plate 231 is a plate; screws 233 are screws for securing plate 231 to base 223; and nuts 235 are nuts corresponding to screws 237.

In further embodiments, the antenna assembly comprises a plurality of antenna group pairs. For example, an antenna assembly comprise a first and a second antenna (and corresponding tuners) that face each other to form a first antenna group, and a third and fourth antenna (and corresponding tuners) face each other to form a second antenna group, wherein the second antenna group is positioned a proximate distance away from the first antenna group.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A multi-band antenna, comprising:
- a radiating element comprising:
  - a feeding portion;
  - an upright low band radiation portion;
  - a first high band radiation portion extending from the upright low band radiation portion; and
  - a second high band radiation portion extending from the upright low band radiation portion; and
- a grounding portion configured to be electrically connected to the upright low band radiation portion.

2. The multi-band antenna of claim 1, further comprising a second low band radiation portion extending from the upright low band radiation portion.

3. The multi-band antenna of claim 2, wherein the second low band radiation portion is not coplanar with the upright low band radiation portion.

4. The multi-band antenna of claim 2, wherein the second low band radiation portion comprises a slit portion extending along at least a portion of its length.

5. The multi-band antenna of claim 4, wherein a third low band radiation portion is defined on a first side of the slit portion and a fourth low band radiation portion is defined on a second side of the slit portion.

6. The multi-band antenna of claim 1, wherein the upright low band radiation portion comprises one or more apertures located proximate a bottom edge of the upright low band radiation portion for connecting the upright low band radiation portion to the grounding portion.

7. The multi-band antenna of claim 6, wherein the one or more apertures are soldering apertures configured for a soldered connection between the upright low band radiation portion and the grounding portion.

8. The multi-band antenna of claim 1, wherein the multi-band antenna is configured to radiate a radio frequency signal of an LTE transmitter.

9. The multi-band antenna of claim 1, wherein the first high band radiation portion comprises a first arm and the second high band radiation portion comprises a second arm.

10. The multi-band antenna of claim 9, wherein at least one of the first arm or the second arm is bent.

11. The multi-band antenna of claim 9, wherein the upright low band radiation portion comprises a front face and wherein the first arm and the second arm extend is a direction the front face is oriented.

12. The multi-band antenna of claim 9, wherein the first arm and the second arm extend from a base of the upright low band radiation portion.

13. The multi-band antenna of claim 9, wherein at least one of the first arm or the second arm comprises a split portion along at least a portion of its length.

14. The multi-band antenna of claim 1, wherein the grounding portion comprises:
- a base portion;
- an arm portion extending vertically from the base portion; and
- and a face portion extending from the arm portion, the face portion configured to be coupled to the upright low band radiation portion.

15. The multi-band antenna of claim 14, wherein the arm portion has a width configured to accommodate connection of a transmission line to the feeding portion.

16. The multi-band antenna of claim 14, wherein the feeding portion is aligned with a central vertical axis of the upright low band radiation portion.

17. The multi-band antenna of claim 1, wherein the grounding portion is configured to be elevated relative to the feeding portion.

18. The multi-band antenna of claim 1, wherein the upright low band radiation portion comprises one or more coupling points configured to connect the radiating element to a non-conductive support.

19. A multi-band antenna, comprising:
- a radiating element comprising:
  - a feeding portion;
  - an upright low band radiation portion;
  - a second low band radiation portion extending from the upright low band radiation portion; and
  - one or more high band radiation portions extending from the upright low band radiation portion; and
- a grounding portion configured to be electrically connected to the upright low band radiation portion.

20. A multi-band antenna, comprising:
- a radiating element comprising:
  - a feeding portion;
  - an upright low band radiation portion; and
  - one or more high band radiation portions extending from the upright low band radiation portion; and
- a grounding portion configured to be electrically connected to the upright low band radiation portion.

* * * * *